United States Patent
Moudgal et al.

(10) Patent No.: US 11,836,711 B2
(45) Date of Patent: Dec. 5, 2023

(54) SYSTEMS AND METHODS FOR SPACE-BASED TRANSACTIONS

(71) Applicant: JPMORGAN CHASE BANK, N.A., New York, NY (US)

(72) Inventors: Keerthi Moudgal, Brooklyn, NY (US); George Kassis, London (GB); Tyrone Lobban, London (GB); Christine Moy, New York, NY (US); Umar Farooq, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 179 days.

(21) Appl. No.: 17/185,629

(22) Filed: Feb. 25, 2021

(65) Prior Publication Data
US 2021/0264407 A1     Aug. 26, 2021

Related U.S. Application Data

(60) Provisional application No. 62/981,457, filed on Feb. 25, 2020.

(51) Int. Cl.
    *G06Q 20/36*     (2012.01)
    *G06Q 20/38*     (2012.01)

(52) U.S. Cl.
    CPC ......... *G06Q 20/367* (2013.01); *G06Q 20/381* (2013.01)

(58) Field of Classification Search
None
See application file for complete search history.

(56) References Cited

U.S. PATENT DOCUMENTS

| | | | | |
|---|---|---|---|---|
| 6,111,542 A | * | 8/2000 | Day | H01Q 21/06 342/359 |
| 10,362,541 B2 | * | 7/2019 | Bull | H04W 52/52 |

(Continued)

OTHER PUBLICATIONS

Boyle, Alan. "How Satellites and Blockchain go Together", Geekwire, https://www.geekwire.com/2019/satellites-blockchain-go-together/, (Feb. 1, 2019). (Year: 2019).*

(Continued)

*Primary Examiner* — Elizabeth H Rosen
(74) *Attorney, Agent, or Firm* — GREENBERG TRAURIG LLP

(57) ABSTRACT

Systems and methods for space-based transactions are disclosed. A method for conducting a space-based transaction may include: (1) a first space-based device determining that it is incapable or will be incapable of providing the service; (2) the first space-based device identifying a second space-based device; (3) the first space-based device requesting capability information for the second space-based device; (4) the first space-based device that the second space-based device is capable of providing the service based on the capability information; and (5) the first space-based device executing a transaction with the second space-based device, wherein the first space-based device pays the second space-based device for the service by transferring payment from an electronic wallet for the first space-based device to an electronic wallet for the second space-based device on the distributed ledger network, and the second space-based device provides the service to the user.

20 Claims, 3 Drawing Sheets

(56) References Cited

U.S. PATENT DOCUMENTS

| | | | | |
|---|---|---|---|---|
| 11,212,110 | B1* | 12/2021 | Griffin | G06F 21/6245 |
| 2001/0034206 | A1* | 10/2001 | Thompson | H04B 7/18519 |
| | | | | 455/12.1 |
| 2015/0170112 | A1 | 6/2015 | Decastro | |
| 2018/0046992 | A1 | 2/2018 | Hanrahan et al. | |
| 2019/0288771 | A1* | 9/2019 | Metzger | H04W 36/30 |
| 2019/0289018 | A1* | 9/2019 | Metzger | H04L 9/50 |
| 2019/0325432 | A1 | 10/2019 | Ow et al. | |
| 2019/0353685 | A1* | 11/2019 | Almeida Cavoto | G06Q 20/145 |
| 2020/0014745 | A1 | 1/2020 | Thurimella et al. | |
| 2020/0065899 | A1* | 2/2020 | Fritsch | G06Q 30/0619 |

OTHER PUBLICATIONS

J. d. La Beaujardiere, R. Mital and R. Mital, "Blockchain Application Within A Multi-Sensor Satellite Architecture," IGARSS 2019—2019 IEEE International Geoscience and Remote Sensing Symposium, Yokohama, Japan, 2019, pp. 5293-5296, doi: 10.1109/IGARSS.2019.8898117. (Year: 2019).*

International Search Report, dated May 19, 2021, from corresponding International Application No. PCT/US2021/019696.

Written Opinion of the International Searching Authority, dated May 19, 2021, from corresponding International Application No. PCT/US2021/019696.

* cited by examiner

SYSTEMS AND METHODS FOR SPACE-BASED TRANSACTIONS

RELATED APPLICATIONS

This application claims priority to, and the benefit of, U.S. Provisional Patent Application Ser. No. 62/981,457, filed Feb. 25, 2020, the disclosure of which is hereby incorporated, by reference, in its entirety.

BACKGROUND OF THE INVENTION

1. Field of the Invention

Embodiments are generally directed to systems and methods for space-based transactions.

2. Description of the Related Art

Over the coining years, space-related services, exploration, tourism, and expansion will expand, driving a need for payment rails to connect humans and machines beyond Earth's atmosphere.

SUMMARY OF THE INVENTION

Systems and methods for space-based transactions are disclosed. According to one embodiment, a method for conducting a space-based transaction may include: (1) requesting, by a first space-based device and from a user, a request for a service, wherein the first space-based device and the user are participants in a distributed ledger network as nodes; (2) determining, by the first space-based device, that it is incapable or will be incapable of providing the service; (3) identifying, by the first space-based device, a second space-based device, wherein the second space-based device may be a participant in the distributed ledger network; (4) requesting, by the first space-based device and from the second space-based device, capability information for the second space-based device; (5) confirming, by the first space-based device, that the second space-based device is capable of providing the service based on the capability information; and (6) executing, by the first space-based device, a transaction with the second space-based device, wherein the first space-based device pays the second space-based device for the service, and the second space-based device provides the service to the user, wherein the first space-based device pays the second space-based device for the service by transferring payment from an electronic wallet for the first space-based device to an electronic wallet for the second space-based device on the distributed ledger network.

In one embodiment, the service may include a data communication service and/or an imaging service.

In one embodiment, 1, the first space-based device may be incapable of providing the service as a result of moving out of a coverage zone, by not being over a coverage zone, etc.

In one embodiment, the payment may be recorded on a side chain when the first space-based device and the second space-based device are out of communication with the distributed ledger network, and a distributed ledger in the distributed ledger network may be updated with the payment on the side chain when communication is restored.

In one embodiment, the first space-based device, the second space-based device, and/or the user are indirect participants in the distributed ledger network.

In one embodiment, the request may be received at a marketplace on the distributed ledger network.

In one embodiment, the payment may be provided as a second service.

In one embodiment, the capability information may be received as a capability attestation from the second space-based device.

In one embodiment, the first space-based device and/or the second space-based device may be a satellite.

In one embodiment, the second space-based device may write a hash of the service provided and/or a token for the service provided to the distributed ledger.

According to another embodiment, a method for conducting space-based foreign exchange transactions may include: (1) determining, by a first space-based user and using a space-based user computer processor, that a foreign exchange transaction is needed; (2) identifying, by the first space-based user and using a space-based user computer processor, a second space-based user as a counterparty to the foreign exchange transaction; (3) agreeing, by the first space-based user and using a space-based user computer processor, to a foreign exchange rate with the second space-based user; and (4) writing, the first space-based user and to a distributed ledger platform, the foreign exchange transaction and the foreign exchange rate, wherein a smart contract executes the foreign exchange transaction using the foreign exchange rate and updates balances in a first space-based user electronic wallet and a second space-based user electronic wallet.

In one embodiment, the foreign exchange transaction may be associated with a pending or potential transaction with the second space-based user, with a third space-based user, etc.

In one embodiment, the foreign exchange transaction may be for stablecoins in a first currency for stablecoins in a second currency.

In one embodiment, the foreign exchange rate may be retrieved from a space-based oracle.

In one embodiment, the foreign exchange rate may be programmatically determined.

In one embodiment, the foreign exchange rate may be based on a bilateral agreement between the first space-based user and the second space-based user.

In one embodiment, the first space-based user and/or the second space-based user are satellites.

In one embodiment, the method may further include transferring, by the first space-based user and using a space-based user computer processor, a balance of the first space-based user electronic wallet to an Earth-based user electronic wallet.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1:
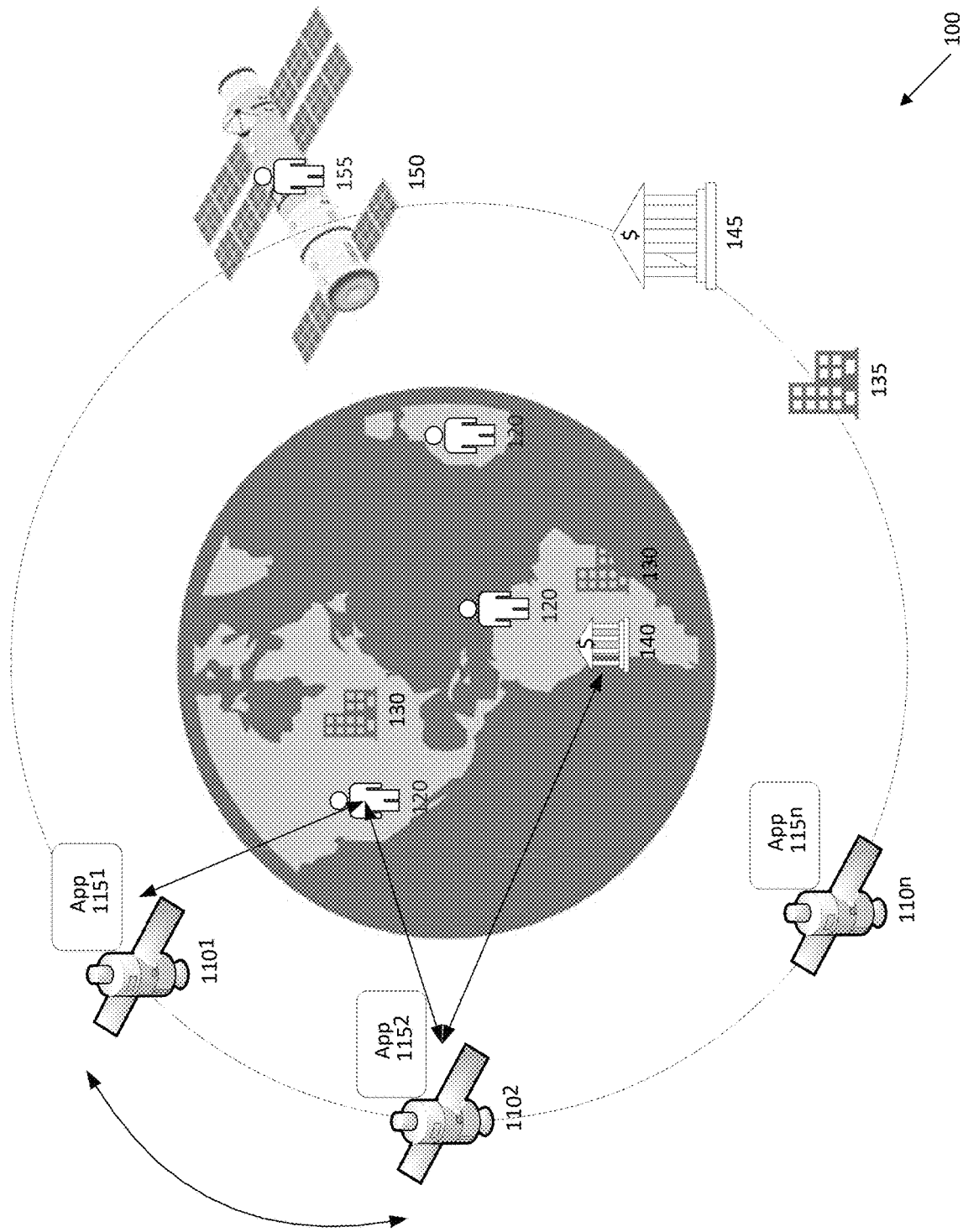
FIG. 1 is a depicts a system for space-based transactions according to an embodiment.

Embodiments are directed to systems and methods for space-based transactions.

Embodiments may include a network of space-based devices (e.g., satellites, space stations, or other vehicles) in space that can transact with one another. The devices can communicate using radio waves, laser beams, and other space-compatible communication mechanisms. These communications may be translated into transactions, monetary or otherwise, that may be processed on, for example, a distributed ledger network.

In embodiments, all the nodes in the distributed ledger may not always be on-line. For example, when a space-based device moves out of range of an Earth-based station, the space-based device (a node in the distributed ledger) may be unable to communicate with the distributed ledger network. Thus, the consensus model may be modified to reflect this occurrence. When the space-based device comes back into range again, the space-based device's distributed ledger may be updated to reflect the current state of the distributed ledger.

In one embodiment, should two space-based devices transact when they are both out of contact with the distributed ledger network, the transaction may be written to a side-chain. The net of the side-chain transaction may be written to the main distributed ledger when one or both space-based devices re-establish communication with distributed ledger network.

In one embodiment, a space-based device that is not in communication with another space-based device or the distributed ledger network may be unable to conduct a transaction until it establishes communication with the distributed ledger network. In one embodiment, the transaction may be queued until communication is restored.

Examples of use cases include a peer-to-peer (P2P) space-based device marketplace, foreign exchange (FX) between devices owned by entities in different jurisdictions, supply chain and tracking delivery of goods, retail payments, asset-based lending, etc. In embodiments, new currencies (e.g., space-based currencies), cryptocurrencies, etc. may be used as is necessary and/or desired.

For example, any satellite, object, or vehicle launched from Earth into space may be owned by the or associated with the jurisdiction in which the owner is based, or the jurisdiction of the government entity that sponsors its launch and/or operations. Thus, that satellite, object or vehicle will look to receive payments in the currency of that jurisdiction for services rendered by that satellite, object, or vehicle. This is analogous to the operation of ships in international waters.

For example, in a peer-to-peer space-based device marketplace, space-based device in orbit (e.g., low Earth orbit) may be owned and operated by different commercial entities; foreign exchange of the payment, therefore, may be required for the transfer of data from one space-based device to the next.

Embodiments facilitate payment using a delivery versus payment settlement of units of data or service for units of payment.

Embodiments may provide the capability for one space-based device to search for other space-based devices and identify space-based devices that provide optimal pricing. This may be due to the limited duration in which the space-based device may have contact with an Earth-based station. The ability to search for space-based devices may accommodate additional, possibly unknown, space-based device operator entities. The space-based devices may communicate with each other using any suitable technology, including by radio, laser, optical, etc. The communications may be transformed into one or more distributed ledger transactions.

In one embodiment, a plurality of transactions may be netted or settled so that only one payment may occur. The netting may occur, and the payment may be made periodically (e.g., hourly, daily, weekly, etc.), when a net reaches a threshold, on demand, etc.

Embodiments may further provide atomic delivery versus payment exchange of value between objects, and the ability to observe the successful transaction from Earth.

Embodiments may involve payments and other transactions involving populated human settlements in space (e.g., space stations, Mars, the Moon, etc.). This may require foreign exchange to a currency in space, or upon return to Earth.

Examples of space-based payments may include real estate (e.g., where people live or stay), machinery (e.g., how to fix things when they break), food/water production and distribution, oxygen supply, research and development, employment, etc.

Embodiments may facilitate payments resulting from space tourism. For example, a retail payment may be made in a space vehicle, in a space-based settlement, etc.

Embodiments may involve a new space-based currency that may be based on an alliance of Earth nations, or as an independent governing body. The currency may be based on a material (e.g., water, oxygen, etc.).

In embodiments, space-based communication may include the underlying and a private key signature for the sending space-based device, and may be written to the distributed ledger once it is translated to a message format consumable by the distributed ledger. In another embodiment, space-based devices may write to their node using their own computing infrastructure, and the space-based devices' space-based communication may be used to propagate information to the other nodes.

In one embodiment, the private key may be generated on Earth and securely communicated to the space-based device. In another embodiment, the private key may be generated by the space-based device.

Embodiments may facilitate payments between space-based entities. Referring to FIG. 1, a system for space-based transactions is illustrated according to one embodiment. System 100 may include a plurality of space-based devices, such as satellites $110_1$, $110_2$, . . . $110_n$, space stations 150, and other space vehicles (not shown) that may each be provided with one or more computer program or app (app) $115_1$, $115_2$, . . . $115_n$. In one embodiment, app $115_1$, $115_2$, . . . $115_n$ may provide functionality for each satellite space-based device to participate in a distributed ledger as a node.

In one embodiment, each space-based device 110 may be provided with a digital wallet (not shown). Each digital wallet may hold, for example, stablecoins and other assets. In one embodiment, the digital wallets may hold attestations as is described in U.S. patent application Ser. No. 17/174,650 filed Feb. 12, 2021, U.S. Provisional Patent Application Ser. No. 62/976,262 filed Feb. 13, 2020 and U.S. Provisional Patent Application Ser. No. 63/126,335 filed Dec. 16, 2020, the disclosures of which are hereby incorporated, by reference, in their entireties. Examples of attestations may include attestations to identify the space-based device, attestations as to who owns the space-based device, attestations as to the space-based device's capabilities (e.g., data capabilities, imaging capabilities, foreign exchange (FX) capabilities, etc.

In another embodiment, the digital wallets may further store digital identities, or DiDs. Examples of digital identities are described in U.S. patent application Ser. No. 16/878,457 filed May 19, 2020 and U.S. Provisional Patent Application Ser. No. 62/850,18, filed May 20, 2019, the disclosures of which are hereby incorporated, by reference, in their entireties.

System 100 may further include vehicle 150, such as a space station, a spaceship, etc. that may carry one or more users 155.

Users 120 and 155 may be humans, machines, systems, etc. They may include satellites 110 and vehicle 150.

System 100 may further include one or more space-based financial institution 145, and one or more space-based businesses 135.

While the entities in FIG. 1 are depicted as being in Earth orbit (e.g., low Earth orbit, or LEO), it should be recognized that some or all of these entities may be in transit from Earth to another celestial body.

Each entity in FIG. 1 may be either a participant (e.g., a node) or may be connected to a participant in a distributed ledger-based network, such as a Blockchain-based network. The devices may communicate using any suitable communication channel, including radio frequency, laser, optical, etc. In embodiments, one entity may serve as a relay for another entity (e.g., one space-based device may communicate with another space-based device via an Earth-based entity). An example of distributed blockchain data management in a satellite environment is disclosed in U.S. Pat. No. 10,567,393, the disclosure of which is hereby incorporated, by reference, in its entirety.

Each space-based device 110 may provide one or more service to Earth-based users 120, such as data communication services, including text, audio, and video communication, imaging, broadband, telecommunications data, bandwidth. For example, the data communication services may facilitate communication between two Earth-based entities, such as users 120, businesses 130, financial institutions 140, etc., an Earth-based entity and a space-based entity, and two space-based entities.

Thus, space-based devices 110 and 150 may provide a marketplace of services that may be accessed by both Earth-based and space-based users. The services may be requested using, for example, the distributed ledger network (e.g., a requesting entity may post a request for a service on the distributed ledger, and a servicing entity may accept that request by writing acceptance to the distributed ledger), or by any other suitable interface.

Space-based devices 110 may communicate with each other, directly or indirectly, and may conduct transactions. For example, space-based device $110_1$ may rent, sell, and/or trade a service, such as bandwidth, to space-based device $110_2$ in response to an increased demand by another space-based device $110_n$, by users 120 on earth, by users 155 in space, etc. As another example, user 120 may request space-based imaging services from space-based device $110_1$, and space-based device $110_1$ may not have the required resolution, may not be over the target area, etc. Therefore, space-based device $110_1$ may request imaging services from space-based device $110_2$.

In one embodiment, the "handover" of services offered by space-based devices 110 may be combined with payments. For example, in response to space-based device $110_1$ transferring services to space-based device $110_2$, space-based device $110_1$ may pay space-based device $110_2$ using, for example, a digital wallet to digital wallet transaction. In one embodiment, the space-based devices may use their supported communication channels to communicate and translate these communications into distributed ledger messages, which may be securely signed by the space-based device's private key and written to a distributed ledger.

Additional applications (not shown) may be deployed to the networks to provide structure and business logic to these interactions.

Figure 2:
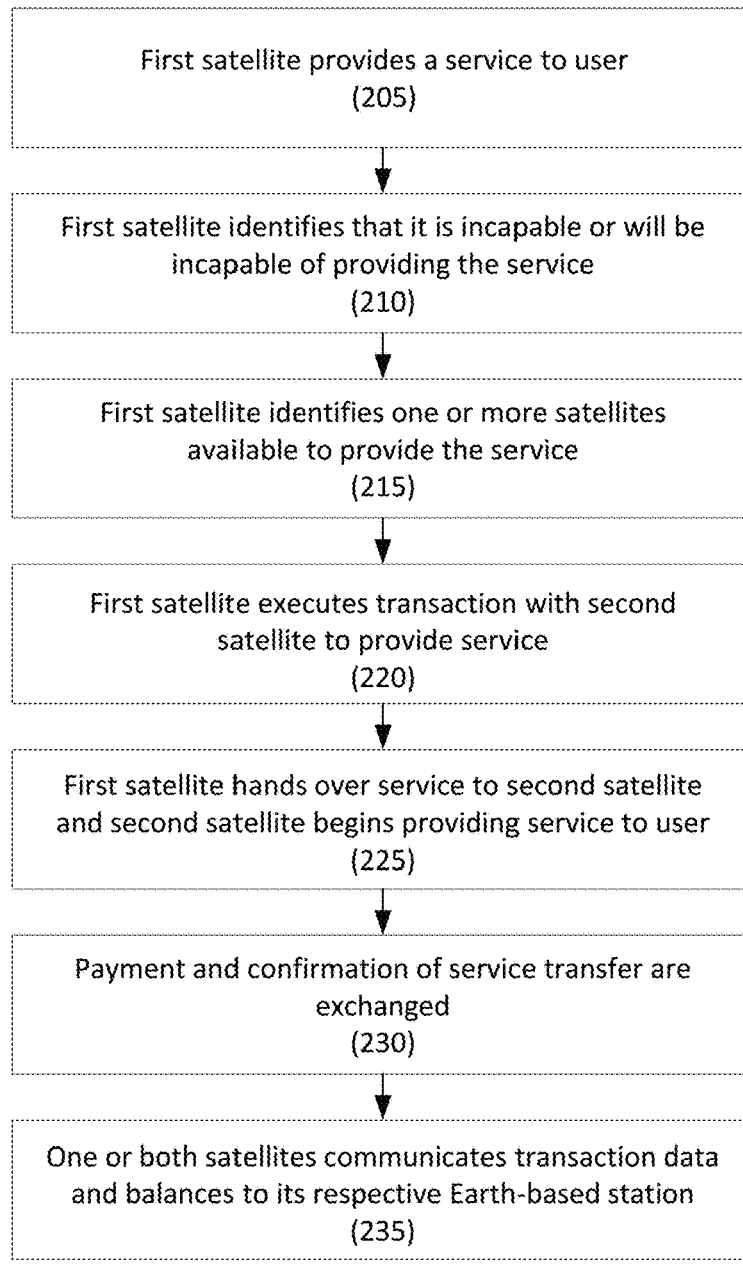
FIG. 2 depicts a method for space-based transactions according to an embodiment.

FIG. 2 depicts a method for space-based transactions according to an embodiment. For example, the method describes interactions that may occur between two space-based devices performing a delivery versus payment handover of a service.

In step 205, a first space-based device may provide, or may be requested to provide, via a marketplace, a service to a user, such as an Earth-based user, a space-based user, another space-based device, etc. The service may be, for example, a data communication service, an imaging service, or any other suitable service.

In one embodiment, the first space-based device may participate in a distributed ledger network, either directly (e.g., as a node) or indirectly (e.g., via a third party).

In step 210, the first space-based device identifies that it is incapable or will become incapable of providing the service. For example, the first space-based device may be on the verge of leaving the coverage zone for the user, and may need to transfer the service to another space-based device that is in the coverage area. As another example, the first space-based device may be requested to provide imaging of a target area of a certain resolution, and the first space-based device may be incapable of providing imaging at that resolution or may not be over the target area.

In step 215, using a computer program or application, the first space-based device may identify one or more additional space-based devices that are participants in the distributed ledger network that are available to provide the service, and may identify a suitable space-based device. For example, the first space-based device may request an attestation from one or more of the other space-based devices to determine which space-based devices are capable of providing the service. The other space-based devices may provide the attestations indicating their capabilities, and the first space-based device may select one of the second space-based devices based on this.

In another embodiment, the first space-based device may communicate with the other space-based devices to determine their rates and capabilities. The first space-based device may select the second space-based device based on the fees and/or the capabilities.

In one embodiment, the space-based devices may negotiate a price using, for example, respective smart contracts on the distributed ledger to reach a price agreement.

In another embodiment, the first space-based device may submit a service request to the marketplace, such as by submitting the request to a distributed ledger. The request may identify requirements for the service. The second space-based device may accept the request by writing acceptance to the distributed ledger. The acceptance may cause the first space-based device to transfer the service to the second space-based device.

In another embodiment, the first space-based device and the second space-based device may trade services. The services may be the same type of service (e.g., bandwidth for bandwidth), or for a different type of service (e.g., bandwidth for imaging).

In step 220, the first space-based device executes the transaction with the second space-based device. The transaction may be written to the distributed ledger. For example, the space-based device's space-based communication may include the data and private key signature, and may be written to the distributed ledger once it is translated to a message format consumable by the distributed ledger. In another embodiment, each space-based device may write to its node using its own computing infrastructure hardware (e.g., Raspberry Pi's, Arduino boards, etc.) and the space-based device's space-based communication may be used to propagate information to the other nodes.

In one embodiment, if both space-based devices are out of contact with the distributed ledger, the transaction may be written to a side chain, of which both space-based devices participate as nodes. Once one or both of the space-based devices are again in contact with the distributed ledger, the net of the side chain may be written to the distributed ledger. This may be done by either space-based device.

In step 225, the service is handed over to the second space-based device, which connects with the user. In one embodiment, the second space-based device may write the assumption of the services to the distributed ledger. The submission may be timestamped with information on when the first space-based device stopped providing the service, when the second space-based device began providing the service, etc.

In one embodiment, the manner of writing the assumption of the service may depend on the type of service provided. For example, if the first space-based device transacts with a second space-based device for imaging data, the second space-based device may provide a hash of the imaging data in exchange for the payment (e.g., the hash may be used to unlock the image stored off-chain), by providing a token that may be used to access the data, etc.

In step 230, payment and confirmation of service transfer may be exchanged. For example, the second space-based device may confirm providing the service to the user, and, in response the first space-based device provide payment from the first space-based device's digital wallet to the second space-based device's digital wallet. In another embodiment, the payment may be made from the consuming user's digital wallet to the second space-based device's digital wallet.

In another embodiment, the services may be pre-paid. Thus, payment may be made when the second space-based device accepts the request for services.

In step 235, the computer program or application executed by one or both of the space-based devices transmits data regarding the transactions and updated balance amounts back to the space-based device's respective Earth-based stations. In one embodiment, if neither space-based device is in communication with its Earth-based station or the distributed leger network, a side-chain may be used to hold the transactions and the net may then be written to the distributed ledger when one of the space-based devices is again in communication the distributed ledger network.

Figure 3:
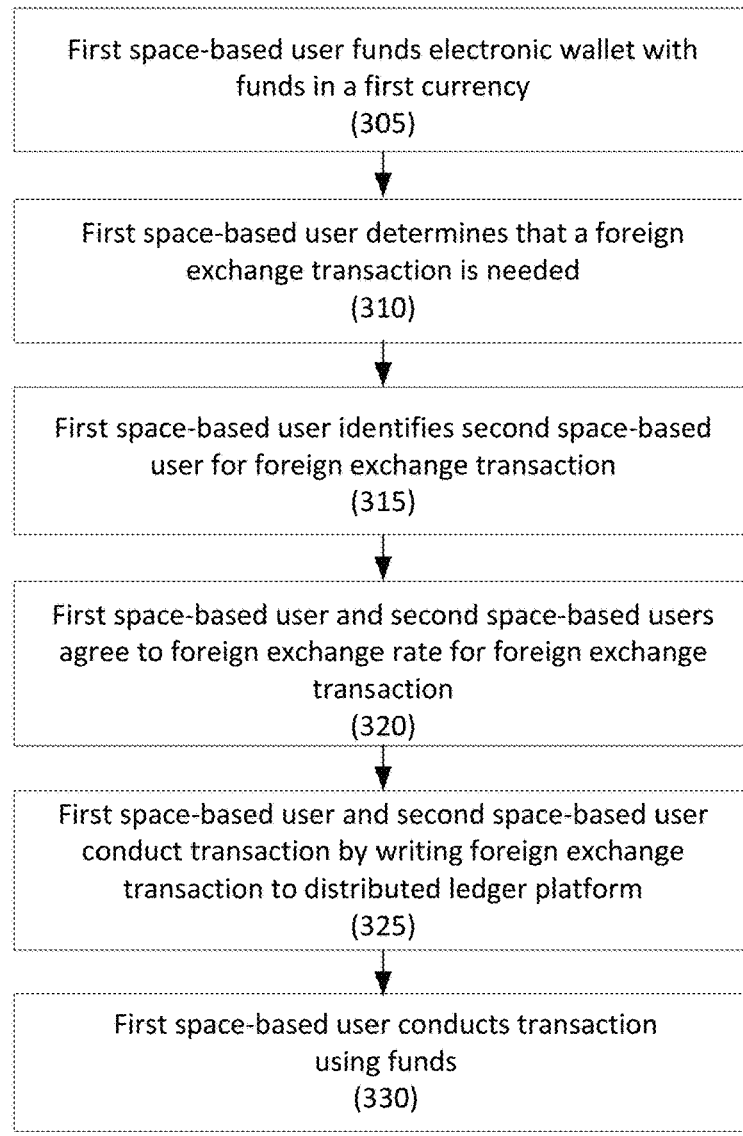
FIG. 3 depicts a method for space-based transactions according to another embodiment.

FIG. 3 depicts a method for space-based foreign exchange transactions according to an embodiment. In embodiments, the transaction may be a foreign exchange transaction involving two space-based devices, users, etc. For example, a user of a first country (e.g., the United States) may conduct a foreign exchange with for goods on a vehicle (e.g., a space station, space vehicle, settlement, etc.), a service provided by a vehicle, etc. of a second country (e.g., India) using the user's own device (e.g., a smartphone). This transaction may require a foreign exchange. The distributed ledger may record balance updates, ownership positions of each currency, etc. during the transaction. For example, the distributed ledger may record who owns each currency (e.g., USD, INR) at any point in time.

In one embodiment, the funds may be in stablecoins, and each stablecoin may be associated with a specific currency (e.g., USD stablecoins, INR stablecoins, etc.).

In one embodiment, the foreign exchange may be conducted as part of a transaction or independently of a transaction. For example, a space-based user may hold stablecoins for different currencies, but may require additional stablecoins for one of the currencies. Thus, the foreign exchange may be conducted to exchange stablecoins of a first currency for stablecoins of a second currency.

In step 305, a space-based user, such as a human or an electronic device, may submit may fund an electronic wallet with funds in a first currency. For example, the space-based user's electronic wallet may be funded by identifying the space-based user's electronic wallet using a digital identifier, or DiD. It may then send an amount to the space-based user's electronic wallet.

For example, a satellite owner may seek to fund a satellite's electronic wallet with stablecoins. Once the satellite owner identifies the satellite's electronic wallet, it may send funds to the satellite.

As another example, a satellite may request that funds be added to its electronic wallet. For example, as satellites interact, they may pay each other for services that are provided. Because the satellites may be associated with different jurisdictions, the satellites may need to have funds in multiple currencies in their electronic wallets. Thus, a satellite that is running low on a certain currency may request funding in a second currency.

In one embodiment, the amount of funding may be based, for example, on past transactions, anticipated transactions, etc.

In step 310, the first space-based user may determine that a foreign exchange transaction is needed. In one embodiment, the foreign exchange transaction may be associated with a payment transaction from the first space-based user to a second space based user, such as payment for the second space-based user providing a service to the first space-based user. In another embodiment, the foreign exchange transaction may be conducted to "exchange" funds in a first currency for funds in a second currency. This may be to conduct a pending transaction, to conduct a future transaction, etc. Any other suitable bases for the foreign exchange transaction may be used as is necessary and/or desired.

In step 315, the first space-based user may identify a second space-based user for the foreign exchange transaction. For example, the second space-based user may be a counterparty a pending or proposed transaction;

As another example, the second space-based user may be identified as a foreign exchange counterparty. The first space-based user may post a proposed foreign exchange transaction, and the second space-based user may accept the foreign exchange transaction. The foreign exchange transaction may be posted on a distributed ledger platform, in an off-chain marketplace, etc.

In one embodiment, a smart contact may match the first space-based user and the second space-based user.

In step 320, the first space-based user and the second space-based user may agree to a foreign exchange rate. In one embodiment, one or both of the first space-based user and the second space-based user may retrieve the foreign exchange rate from an oracle, such as a third space-based user; in another embodiment, the e first space-based user and the second space-based user may reach a bilateral agreement on the foreign exchange rate; in another embodiment, the foreign exchange rate may be programmatically determined based on, for example, supply and demand of one or both of the currencies.

In step 325, after the first space-based user and the second space-based user agree to the foreign exchange rate, they may conduct the foreign exchange transaction by writing the foreign exchange transaction to a distributed ledger platform. In one embodiment, details for the foreign exchange transaction, such as the currency amounts, the foreign exchange rate, etc. may be written.

The balances the electronic wallets for the first space-based user and the second space-based user may be updated by, for example, one or more smart contract.

In step 330, the first space-based user may conduct a transaction with the second space-based user, or another space-based user, using the currency received as a result of the foreign exchange transaction.

In another embodiment, the first space-based user may transfer some or all of the contents of its electronic wallets to an Earth-based user. For example, if the Earth-based user operates one or more satellite, the Earth-based user may periodically retrieve funds from its satellite(s). In one embodiment, the funds may be transferred to the Earth-based user's electronic wallet by writing the transaction to the distributed ledger.

In one embodiment, the space-based user and the Earth-based user may be the same.

In one embodiment, the space-based user or the Earth-based user may redeem the currency in their electronic wallets for fiat currency.

The disclosure of U.S. patent application Ser. No. 15/233,719 filed Aug. 10, 2016 and U.S. Provisional Patent Application Ser. No. 63/045,659, filed Jun. 29, 2020, are hereby incorporated, by reference, in their entireties.

The disclosures of U.S. Provisional patent application Ser. No. 16/677,609, filed Nov. 7, 2020, and U.S. Provisional Patent Application Ser. No. 62/757,614, filed Nov. 8, 2018, U.S. Provisional Patent Application Ser. No. 62/446,185 filed Jan. 13, 2017 and U.S. patent application Ser. No. 15/869,421, filed Jan. 12, 2018, U.S. patent application Ser. No. 16/653,369, U.S. patent application Ser. No. 16/558,415, U.S. patent application Ser. No. 15/869,421, U.S. Provisional Patent Application Ser. No. 62/725,331, U.S. Provisional Patent Application Ser. No. 62/446,185, U.S. Provisional Patent Application Ser. No. 62/948,702, filed Dec. 16, 2019, U.S. Provisional Patent Application Ser. No. 62/525,600, filed Jun. 27, 2017, and U.S. patent application Ser. No. 16/020,473 filed Jun. 27, 2018 are hereby incorporated, by reference, in their entireties.

Although several embodiments have been disclosed, it should be recognized that these embodiments are not exclusive to each other, and certain elements or features from one embodiment may be used with another.

Hereinafter, general aspects of implementation of the systems and methods of the invention will be described.

The system of the invention or portions of the system of the invention may be in the form of a "processing machine," such as a general-purpose computer, a quantum computing device, a quantum computing device simulator, etc. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for conducting a space-based transaction, comprising:
    receiving, by a first space-based device and from a user, a request for a service, wherein the first space-based device and the user are participants in a distributed ledger network as nodes;
    providing, by the first space-based device, the service to the user;
    determining, by the first space-based device, that it will be incapable of providing the service;
    identifying, by the first space-based device, a second space-based device, wherein the second space-based device is a participant in the distributed ledger network;
    requesting, by the first space-based device and from the second space-based device, capability information for the second space-based device;
    confirming, by the first space-based device, that the second space-based device is capable of providing the service based on the capability information;
    transferring, by the first space-based device, the service to the second space-based device, wherein the second space-based device is configured to provide the service to the user; and
    executing, by the first space-based device, a transaction with the second space-based device, wherein the first space-based device pays the second space-based device for the service by transferring payment from an electronic wallet for the first space-based device to an electronic wallet for the second space-based device on the distributed ledger network.

2. The method of claim 1, wherein the service comprises a data communication service and/or an imaging service.

3. The method of claim 1, wherein the first space-based device will be incapable of providing the service by moving out of a coverage zone.

4. The method of claim 1, wherein the first space-based device is incapable of providing the service by not being over a coverage zone.

5. The method of claim 1, wherein the payment is recorded on a side chain when the first space-based device and the second space-based device are out of communication with the distributed ledger network, and a distributed ledger in the distributed ledger network is updated with the payment on the side chain when communication is restored.

6. The method of claim 1, wherein the first space-based device, the second space-based device, and/or the user are indirect participants in the distributed ledger network.

7. The method of claim 1, wherein the request is received at a marketplace on the distributed ledger network.

8. The method of claim 1, wherein the payment is provided as a second service.

9. The method of claim 1, wherein the capability information is received as a capability attestation from the second space-based device.

10. The method of claim 1, wherein the first space-based device and/or the second space-based device is a satellite.

11. The method of claim 1, wherein the second space-based device writes a hash of the service provided and/or a token for the service provided to the distributed ledger.

12. A non-transitory computer readable storage medium, including instructions stored thereon, which when read and executed by one or more computer processors in a first space-based device, cause the one or more computer processors to perform steps comprising:
    receiving, from a user, a request for a service, wherein the user and the first space-based device are participants in a distributed ledger network as nodes;
    providing the service to the user;
    determining that the first space-based device will be incapable of providing the service;
    identifying, a second space-based device, wherein the second space-based device is a participant in the distributed ledger network;
    requesting, from the second space-based device, capability information for the second space-based device;
    confirming that the second space-based device is capable of providing the service based on the capability information;
    transferring the service to the second space-based device, wherein the second space-based device is configured to provide the service to the user; and
    executing transaction with the second space-based device, wherein the first space-based device pays the second space-based device for the service by transferring payment from an electronic wallet for the first space-based device to an electronic wallet for the second space-based device on the distributed ledger network.

13. The non-transitory computer readable storage medium of claim 12, wherein the service comprises a data communication service and/or an imaging service.

14. The non-transitory computer readable storage medium of claim 12, wherein the first space-based device will be incapable of providing the service by moving out of a coverage zone or by not being over a coverage zone.

15. The non-transitory computer readable storage medium of claim 12, wherein the payment is recorded on a side chain when the first space-based device and the second space-based device are out of communication with the distributed ledger network, and a distributed ledger in the distributed ledger network is updated with the payment on the side chain when communication is restored.

16. The non-transitory computer readable storage medium of claim 12, wherein the request is received at a marketplace on the distributed ledger network.

17. The non-transitory computer readable storage medium of claim 12, wherein the payment is provided as a second service.

18. The non-transitory computer readable storage medium of claim 12, wherein the capability information is received as a capability attestation from the second space-based device.

19. The non-transitory computer readable storage medium of claim 12, wherein the first space-based device and/or the second space-based device is a satellite.

20. The non-transitory computer readable storage medium of claim 12, wherein the second space-based device is configured to write a hash of the service provided and/or a token for the service provided to the distributed ledger.

* * * * *